Figure 1:
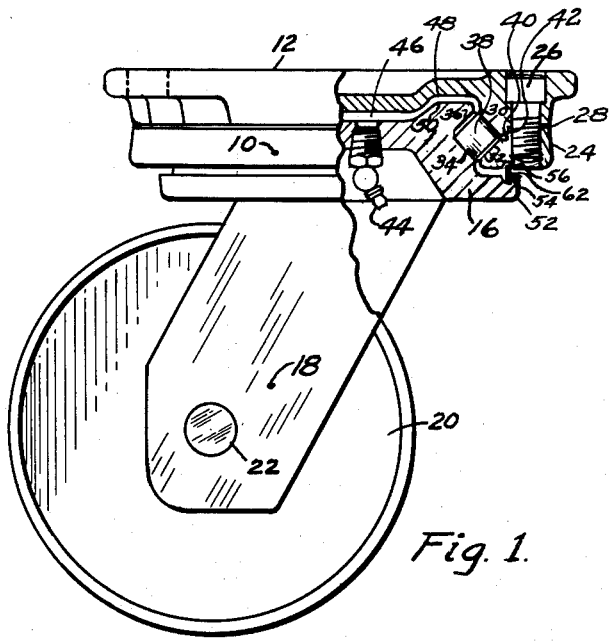

May 24, 1955     O. P. DEAN     2,708,767

CASTER CONSTRUCTION

Filed Dec. 6, 1952

INVENTOR
Otis P. Dean

BY *Jaurnan V. Beaman*
ATTORNEY

United States Patent Office 2,708,767
Patented May 24, 1955

2,708,767
CASTER CONSTRUCTION
Otis P. Dean, Lansing, Mich.
Application December 6, 1952, Serial No. 324,509
1 Claim. (Cl. 16—22)

The present invention relates to improvements in caster construction especially designed for heavy duty industrial use.

It is the primary object of the invention to provide an improved caster of the aforesaid type which is capable of withstanding over long periods of use the punishing shocks incident to conveying heavy loads under conditions prevailing in industrial plants and their surroundings with free swiveling action and a minimum of service requirements.

In carrying out the primary object of the present invention, the conventional center or king pin in caster constructions has been replaced by a single enlarged annular bearing which preferably comprises a large number of rollers of uniform cylindrical form having diameters in excess of their length with alternate rollers having their axis angularly disposed to each other. The rollers are confined between inner and outer raceways with the inner raceway being an integral part of the swiveling yoke plate of the caster and having a pair of angularly disposed annular surfaces to provide surface contact with the periphery of the rollers. Complimentary angularly disposed surfaces are defined by the outer raceway which is partly formed by a circular projection on the fixed mounting plate of the caster and partly defined by a lock ring which is piloted upon the mounting plate.

The preferred form of the invention is such that the resulting caster has special advantages for use in service where excessive moisture conditions prevail. This is for the reason that the mounting plate and outer raceway combine to define an inverted cup which virtually precludes the introduction of water or other liquids into vital parts of the assembly.

Another object of the invention is to provide a caster having an improved running seal for retaining the lubricant within the bearing and for effectively preventing the introduction of dirt and moisture. This is preferably accomplished by providing a radial flange which underlaps the locking ring and locating a novel sealing spring within opposed recesses defined in the opposed radial surfaces of the radial flange and locking ring.

A further object of the invention is to provide a caster in which the design of the lubricant reservoir and bearing structure is such that "channeling" of the lubricant is obviated and rotational and gravitational forces function to maintain a supply of lubricant to the bearing.

These and other objects and advantages residing in the combination and arrangement of parts and in the detailed construction thereof will more fully appear from the following specification and appended claim.

Figure 2:
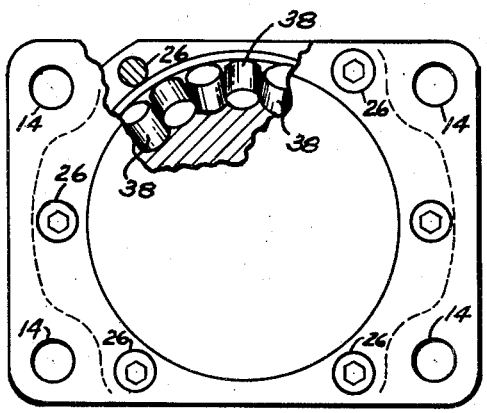
Figure 3:
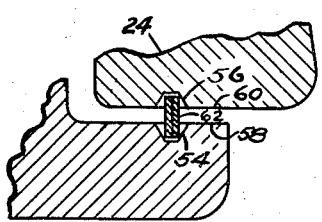
Figure 4:

In the drawings:

Fig. 1 is a side-elevational view of the caster construction partially shown in broken vertical section, Fig. 2 is a plan view of Fig. 1 partially shown in broken section, Fig. 3 is an enlarged view of the seal structure, and Fig. 4 is a side-elevational view of the spring sealing strip.

Referring to the illustrated form of the invention, my improved caster 10 comprises a top or mounting plate 12 having holes 14 to receive both for attaching the caster, a swivel yoke plate 16 carrying legs 18 between which the wheel 20 is mounted on the pin 22.

The lock ring 24 is attached to the plate 12 by screws 26. To avoid holding extremely close manufacturing tolerances, shims 28 may be located between the plate 12 and ring 24 to provide the proper spacing of the annular surfaces 30 and 32 which define the outer raceway of the bearing structure.

Annular surfaces 34 and 36 on the plate 16 define the inner raceway of the bearing structure. Between the inner and outer raceways defined by the surfaces 30, 32, 34 and 36 I preferably locate an even number of similar cylindrical bearings 38 of slightly greater diameter than length. As shown in Fig. 2, alternate bearings 38 have their axis angularly disposed to those directly adjacent.

Preferably the surfaces 30, 32, 34 and 36 are conical with the surfaces defining each raceway being disposed at 90° to each other. With the bearing 38 in position and the locking ring 24 properly spaced by the shims 28, the distance between the surfaces 30 and 34 will correspond to the diameter of the alternate bearings 38 disposed with their axes parallel to the lines of contact between the periphery of such alternate bearings 38 and the surfaces 30 and 34. Likewise, the distance between the surfaces 32 and 36 will correspond to the diameter of the intermediate bearings 38 having their axes parallel to the lines of contact between the periphery of such intermediate bearings 38 and the surfaces 32 and 36. If the bearings 38 are all of the same size, with a slightly greater diameter than length, each bearing 38 will have clearance at its ends depending upon the difference between the diameter and the length of the bearings 38. In practice, with the bearings 38 of a diameter of .371" the length may be in the order of .355".

To assure accurate association of the locking ring 24 with the plate 12 to define the outer raceway, the plate 12 is machined with a pilot portion 40 with which the circular lip portion 42 of the ring 24 is closely fitted upon assembly.

Grease or other suitable lubricant is introduced through the fitting 44 into the reservoir 46 from where it is urged by the relative rotation between the spaced surfaces 48 and 50, as well as gravity, into the chamber in which the bearings 38 are located. As the grease has a tendency to be squeezed out toward the ends of the rollers 38 "channeling" is avoided in my improved bearing assembly because the grease squeezed out toward the end of one roller is directly disposed in the path of the adjacent roller.

The inverted cup arrangement above described with respect to the grease reservoir and bearing chamber is extended by a radial flange 52 on the plate 16 which has running clearance with the locking ring 24. To further seal the assembly against dirt and moisture, I provide annular recesses 54 and 56 in the opposed radial surfaces 58 and 60 to receive a suitable sealing structure. Preferably the sealing structure takes the form of a thin spring metal strip 62 as shown in Fig. 4 wound upon itself to form a multi-ply ring and inserted within the annular chamber defined by the recesses 54 and 56. The sides of the recesses 54 and 56 are shown tapered to assist in the centering of the spring metal seal. The resiliency of the spring strip 62 causing it to unwind and increase in diameter, aided by the pressure of the grease introduced through the fitting 44, will cause the strip 62 to effectively seal the clearance between the surfaces 58 and 60.

It will be readily appreciated by those skilled in the art of casters that I have provided a heavy duty caster construction of similar inexpensive design in which support has been provided for all radial and thrust loads regardless of the direction from which the load or shock force is applied, and this support is provided throughout the periphery of the bearing structure. Also, these advantages have been obtained with a minimum of overall caster height with a maximum of wheel diameter. It is also to be noted that in my improved caster structure the diameter of the bearing structure is relatively large as compared to the overall size of the caster yet the retaining structure for the caster parts are all located beyond the periphery of the bearing structure.

While I prefer to use substantially cylindrical rollers for bearings 38 to avoid as much end thrust of the roller in its raceway, the use of slightly tapered rollers are considered within the scope of the invention where the taper is only a matter of a few degrees and insufficient to cause objectionable end thrust. Obviously the raceways will depart from 90° the amount of the taper of the rollers.

Having thus described my invention what I claim is new and desire to protect by Letters Patent is:

A heavy duty industrial caster comprising a mounting plate, a swivel plate having wheel structure supported thereon, an inner bearing raceway defined by said swivel plate, an outer bearing raceway partially defined by said mounting plate, a locking ring attachable to said mounting plate and defining the remainder of said outer bearing raceway, said raceways collectively defining an annular bearing chamber and being complementary to each other and each raceway being in the form of conical surfaces disposed at substantially 90 degrees to each other with all of said surfaces being generated about a common axis, bearing members in the form of substantially cylindrical rollers of slightly greater diameter than length disposed within said chamber in peripheral contact with said raceways, alternate rollers having peripheral contact with one set of opposed surfaces of said raceways and intermediate rollers having peripheral contact with the other set of opposed surfaces of said raceways whereby the axes of adjacent rollers are disposed at substantially 90 degrees to each other, said rollers and raceways constituting the sole connection between said plates for providing swivel action therebetween and for providing all radial and thrust support, said plates having spaced opposed surfaces shaped to define an inverted cup-shaped lubricant reservoir and passage leading into said chamber, a radial flange on said swivel plate underlapping said locking ring, opposed annular recesses in the opposed radial faces of said flange and locking ring, and a spring metal strip coiled upon itself in said recesses and radially expanded into sealing relationship with the outer sides of said recesses.

References Cited in the file of this patent
UNITED STATES PATENTS

| | | |
|---|---|---|
| 1,796,068 | Van Der Meer | Mar. 10, 1931 |
| 1,822,998 | Noelting | Sept. 15, 1931 |
| 2,306,189 | Schweickart et al. | Dec. 22, 1942 |
| 2,313,084 | Manly | Mar. 9, 1943 |
| 2,430,359 | Messinger | Nov. 4, 1947 |
| 2,459,290 | Rozner | Jan. 18, 1949 |
| 2,566,448 | Heintz et al. | Sept. 4, 1951 |
| 2,611,450 | Kalikow | Sept. 23, 1952 |

FOREIGN PATENTS

| | | |
|---|---|---|
| 973,265 | France | Feb. 9, 1951 |